United States Patent
Bayramian et al.

(10) Patent No.: US 10,476,226 B2
(45) Date of Patent: Nov. 12, 2019

(54) METHOD AND SYSTEM FOR COMPACT EFFICIENT LASER ARCHITECTURE

(71) Applicant: Lawrence Livermore National Security, LLC, Livermore, CA (US)

(72) Inventors: Andrew James Bayramian, Manteca, CA (US); Kenneth Manes, Brentwood, CA (US); Robert J. Deri, Pleasanton, CA (US); Al Erlandson, Livermore, CA (US); John Caird, San Francisco, CA (US); Mary Spaeth, Brentwood, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1133 days.

(21) Appl. No.: 14/820,375

(22) Filed: Aug. 6, 2015

(65) Prior Publication Data
US 2019/0305509 A1 Oct. 3, 2019

Related U.S. Application Data

(62) Division of application No. 13/284,525, filed on Oct. 28, 2011, now Pat. No. 9,136,668.
(Continued)

(51) Int. Cl.
*H01S 3/13* (2006.01)
*H01S 3/23* (2006.01)
(Continued)

(52) U.S. Cl.
CPC ............ *H01S 3/2341* (2013.01); *H01S 3/005* (2013.01); *H01S 3/0071* (2013.01); *H01S 3/027* (2013.01);
(Continued)

(58) Field of Classification Search
CPC ...... H01S 3/2341; H01S 3/2316; H01S 3/005; H01S 3/0071; H01S 3/027; H01S 3/0404; H01S 3/08072; H01S 3/09408; H01S 3/0941; H01S 3/09415; H01S 3/10061; H01S 3/1308; H01S 3/10007
See application file for complete search history.

(56) References Cited

U.S. PATENT DOCUMENTS 5,106,193 A 4/1992 Fesler et al.
5,268,787 A 12/1993 McIntyre
(Continued)

OTHER PUBLICATIONS

Spaeth, et al., "National Ignition Facility Wavefront Requirements and Optical Architecture", Society of Photo-Optical Instrumentation Engineers, Opt. Eng. 43(12) 2854-2865 (Dec. 2004).
(Continued)

*Primary Examiner* — Kinam Park
(74) *Attorney, Agent, or Firm* — Foley & Lardner LLP

(57) ABSTRACT

A laser amplifier module having an enclosure includes an input window, a mirror optically coupled to the input window and disposed in a first plane, and a first amplifier head disposed along an optical amplification path adjacent a first end of the enclosure. The laser amplifier module also includes a second amplifier head disposed along the optical amplification path adjacent a second end of the enclosure and a cavity mirror disposed along the optical amplification path.

11 Claims, 9 Drawing Sheets

Related U.S. Application Data

(60) Provisional application No. 61/408,222, filed on Oct. 29, 2010.

(51) Int. Cl.
*H01S 3/00* (2006.01)
*H01S 3/02* (2006.01)
*H01S 3/04* (2006.01)
*H01S 3/10* (2006.01)
H01S 3/094 (2006.01)
H01S 3/0941 (2006.01)
H01S 3/08 (2006.01)

(52) U.S. Cl.
CPC ........ *H01S 3/0404* (2013.01); *H01S 3/10007* (2013.01); *H01S 3/10061* (2013.01); *H01S 3/1308* (2013.01); *H01S 3/2316* (2013.01); H01S 3/08072 (2013.01); H01S 3/0941 (2013.01); H01S 3/09408 (2013.01); H01S 3/09415 (2013.01)

(56) References Cited

U.S. PATENT DOCUMENTS

| | | | |
|---|---|---|---|
| 5,689,363 A | 11/1997 | Dane et al. | |
| 5,717,516 A * | 2/1998 | Klein | G02F 1/397 359/334 |
| 6,198,069 B1 | 3/2001 | Hackel et al. | |
| 6,510,170 B1 | 1/2003 | Ravnitzki et al. | |
| 2004/0146075 A1 | 7/2004 | Kennedy et al. | |
| 2006/0109878 A1 | 5/2006 | Rothenberg | |
| 2009/0103575 A1* | 4/2009 | Abe | G03F 7/70033 372/5 |
| 2011/0043899 A1* | 2/2011 | Erlandson | G02B 27/0966 359/347 |
| 2012/0105931 A1* | 5/2012 | Deri | G02F 1/0311 359/257 |
| 2012/0114008 A1* | 5/2012 | Bayramian | H01S 3/0612 372/75 |
| 2014/0376085 A1* | 12/2014 | Papadopoulos | H01S 3/2316 359/349 |

OTHER PUBLICATIONS

Bayramian, et al., "The Mercury Project: A High Average Power, Gas-Cooled Laser for Inertial Fusion Energy Development", Fusion Science and Technology, vol. 52, pp. 383-387 (Oct. 2007).

\* cited by examiner

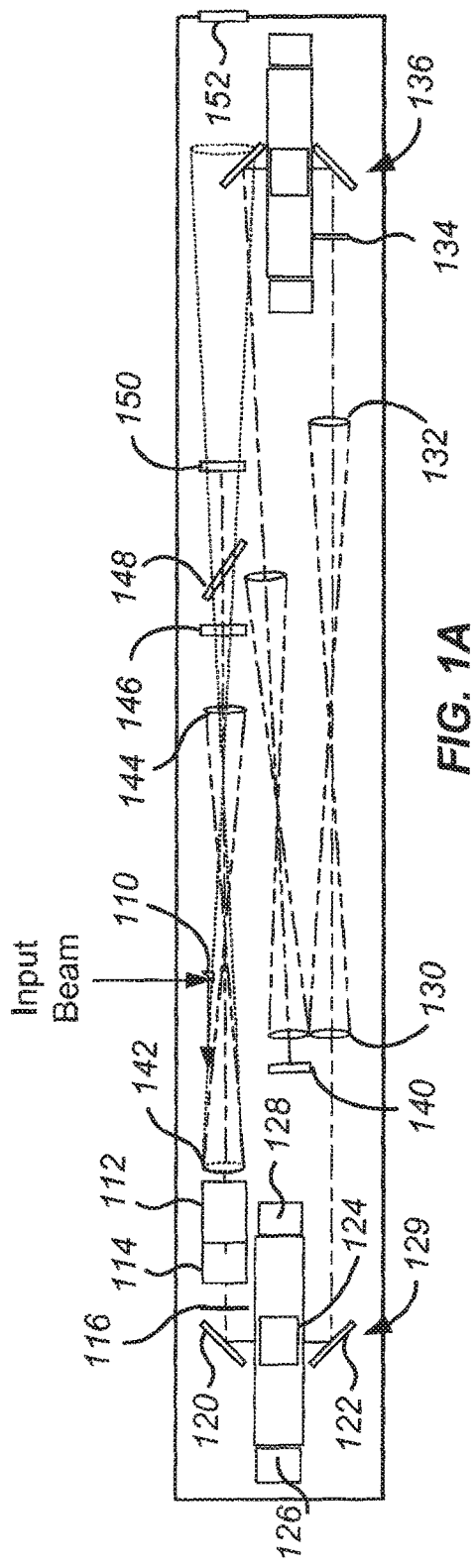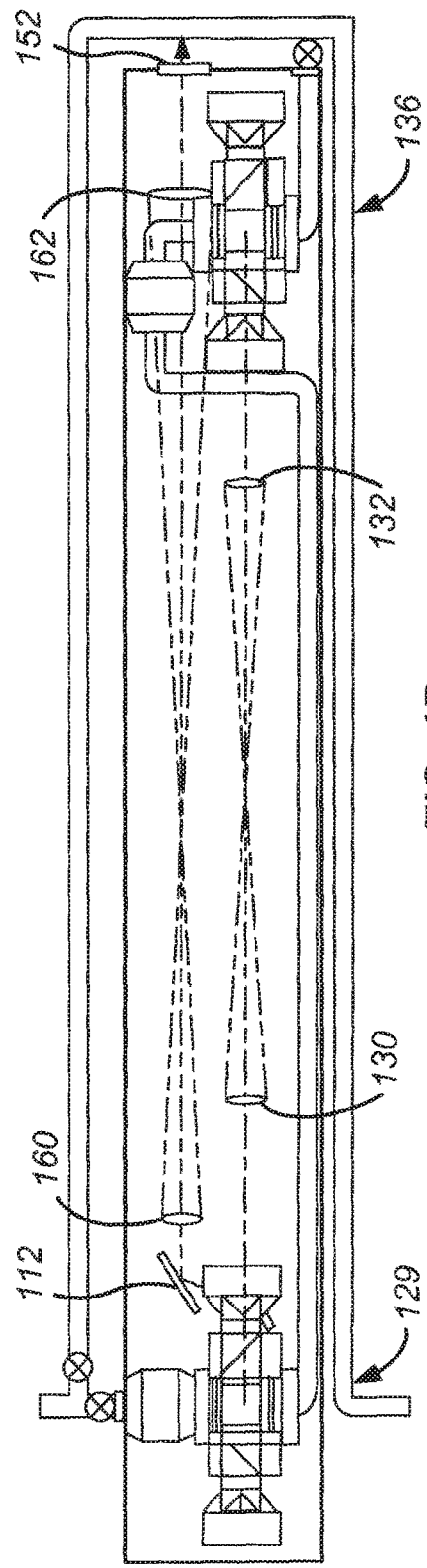

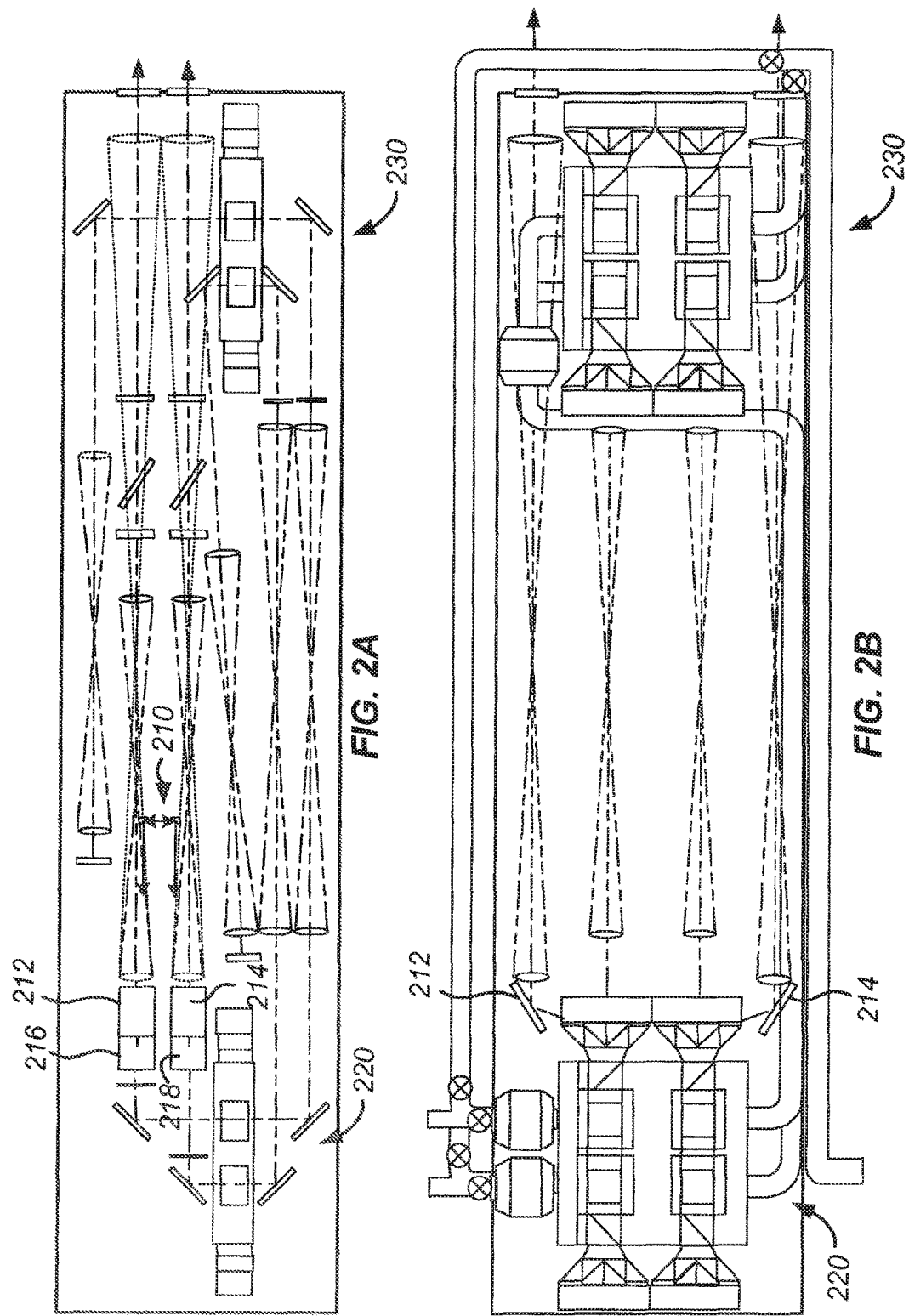

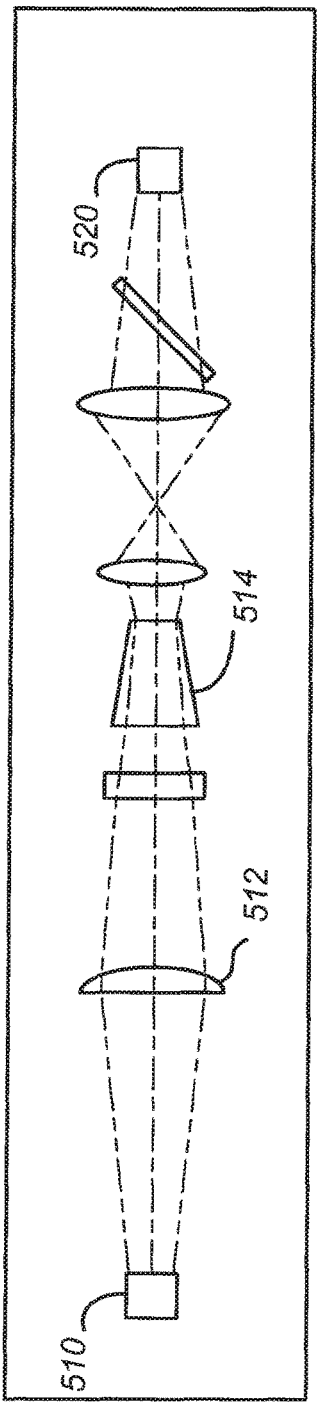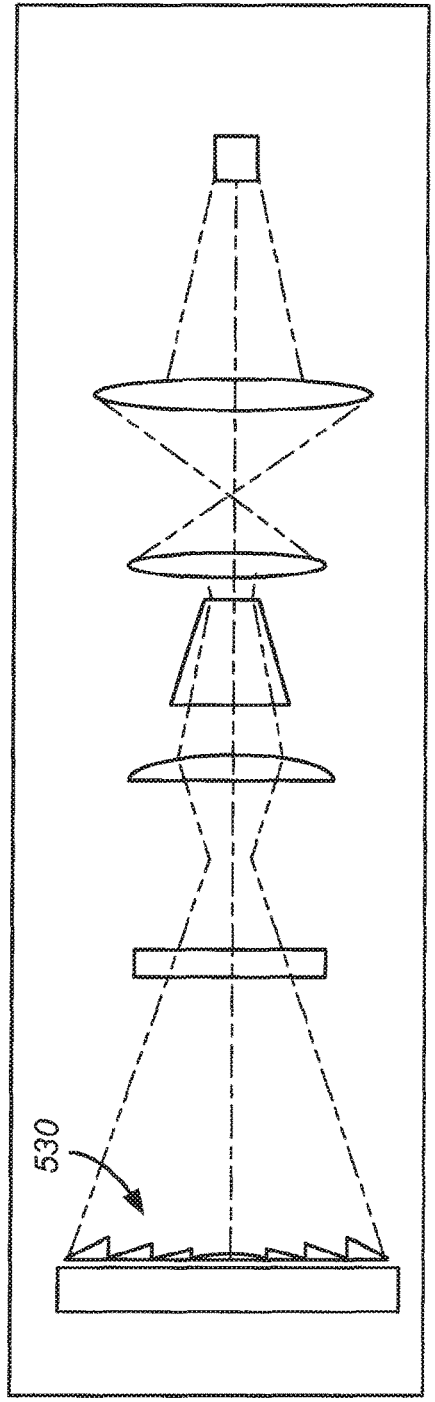

METHOD AND SYSTEM FOR COMPACT EFFICIENT LASER ARCHITECTURE

CROSS-REFERENCES TO RELATED APPLICATIONS

This application claims priority to U.S. Provisional Patent Application No. 61/408,222, filed Oct. 29, 2010, the disclosure of which is hereby incorporated by reference in its entirety for all purposes.

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

Projections by the Energy Information Agency and current Intergovernmental Panel on Climate Change (IPCC) scenarios expect worldwide electric power demand to double from its current level of about 2 terawatts electrical power (TWe) to 4 TWe by 2030, and could reach 8-10 TWe by 2100. They also expect that for the next 30 to 50 years, the bulk of the demand of electricity production will be provided by fossil fuels, typically coal and natural gas. Coal supplies 41% of the world's electric energy today, and is expected to supply 45% by 2030. In addition, the most recent report from the IPCC has placed the likelihood that man-made sources of $CO_2$ emissions into the atmosphere are having a significant effect on the climate of planet earth at 90%. "Business as usual." baseline scenarios show that $CO_2$ emissions could be almost two and a half times the current level by 2050. More than ever before, new technologies and alternative sources of energy are essential to meet the increasing energy demand in both the developed and the developing worlds, while attempting to stabilize and reduce the concentration of $CO_2$ in the atmosphere and mitigate the concomitant climate change.

Nuclear energy, a non-carbon emitting energy source, has been a key component of the world's energy production since the 1950's, and currently accounts for about 16% of the world's electricity production, a fraction that could—in principle—be increased. Several factors, however, make its long-term sustainability difficult. These concerns include the risk of proliferation of nuclear materials and technologies resulting from the nuclear fuel cycle; the generation of long-lived radioactive nuclear waste requiring burial in deep geological repositories; the current reliance on the once through, open nuclear fuel cycle; and the availability of low cost, low carbon footprint uranium ore. In the United States alone, nuclear reactors have already generated more than 55,000 metric tons (MT) of spent nuclear fuel (SNF). In the near future, we will have enough spent nuclear fuel to fill the *Yucca* Mountain geological waste repository to its legislated limit of 70,000 MT.

Fusion is an attractive energy option for future power generation, with two main approaches to fusion power plants now being developed. In a first approach, Inertial Confinement Fusion (ICF) uses lasers, heavy ion beams, or pulsed power to rapidly compress capsules containing a mixture of deuterium (D) and tritium (T). As the capsule radius decreases and the DT gas density and temperature increase, DT fusion reactions are initiated in a small spot in the center of the compressed capsule. These DT fusion reactions generate both alpha particles and 14.1 MeV neutrons. A fusion burn front propagates from the spot, generating significant energy gain. A second approach, magnetic fusion energy (MFE) uses powerful magnetic fields to confine a DT plasma and to generate the conditions required to sustain a burning plasma and generate energy gain.

Important technology for ICF is being developed primarily at the National Ignition Facility (NIF) at Lawrence Livermore National Laboratory (LLNL), assignee of this invention, in Livermore, Calif. There, a laser-based ICF project designed to achieve thermonuclear fusion ignition and burn utilizes laser energies of 1 to 1.3 MJ. Fusion yields of the order of 10 to 20 MJ are expected. Fusion yields in excess of 200 MJ are expected to be required in a central hot spot fusion geometry if fusion technology, by itself, were to be used for cost effective power generation. Thus, significant technical challenges remain to achieve an economy powered by pure ICF energy.

In addition to ICF applications, there is broad interest in the area of high-average-power lasers for materials processing, drilling, cutting and welding, military applications, and the like. Conventional high power laser designs utilize architectures with large footprints and associated costs. Thus, there is a need in the art for laser and amplifier architectures that are compact, providing high power output at reduced system cost.

SUMMARY OF THE INVENTION

The present invention relates generally to laser systems. More specifically, the present invention relates to methods and systems for generating high power laser beams using a four-pass amplifier architecture. Merely by way of example, the invention has been applied to an amplifier assembly utilizing either transverse pumping or end pumping of amplifiers in a compact architecture. The methods and systems can be applied to a variety of other laser amplifier architectures and laser systems.

According to an embodiment of the present invention, a laser amplifier module including an enclosure is provided. The laser amplifier module includes an input window, a mirror optically coupled to the input window and disposed in a first plane, and a first amplifier head disposed along an optical amplification path adjacent a first end of the enclosure. The laser amplifier module also includes a second amplifier head disposed along the optical amplification path adjacent a second end of the enclosure and a cavity mirror disposed along the optical amplification path.

According to another embodiment of the present invention, a method of amplifying a laser beam is provided. The method includes receiving an input beam, directing the input beam along a first direction, and amplifying the input beam a first time using a set of amplifiers. The amplification paths through the set of amplifiers are disposed along a second direction substantially orthogonal to the first direction. The method also includes reflecting the amplified beam using a first cavity mirror, amplifying the amplified beam a second time using the set of amplifiers, image relaying the twice amplified beam along the first direction, and reflecting the amplified beam using a second cavity mirror. The method further includes amplifying the twice amplified beam a third time using the set of amplifiers, reflecting the three times amplified beam using the first cavity mirror, amplifying the three times amplified beam using the set of amplifiers, and outputting the four times amplified beam.

According to a specific embodiment of the present invention, a quad-beam laser amplifier module including an enclosure is provided. The quad-beam laser amplifier module includes a set of four input ports disposed on a top surface of the enclosure and a set of four output ports disposed on the second end of the enclosure. The quad-beam laser amplifier module also includes a first amplifier head disposed at a first end of the enclosure, wherein the first amplifier head includes four amplifiers, a second amplifier head disposed at a second end of the enclosure, wherein the second amplifier head includes four amplifiers, and a cavity mirror operable to reflect light into the second amplifier head.

Embodiments of the present invention provide an amplifier module in which the number of optics is reduced in comparison with conventional designs while increasing the efficiency with which pump light is delivered to the amplifier slabs, which can be suitable for high peak power and high average power applications (e.g., 23.3 cm×23.3 cm in the transverse dimensions). Additionally, embodiments of the present invention increase the depth of field in comparison with conventional designs, enabling the use of a number of amplifier slabs, for example, ten amplifier slabs per amplifier head. Embodiments of the present invention are not limited to ten amplifier slabs and fewer or greater numbers can be utilized as appropriate to the particular implementation. Some embodiments reduce beam distortion to provide a generally "square" beam, which is pumped using diode arrays that are imaged to the center of the amplifier head.

Numerous benefits are achieved by way of the present invention over conventional techniques. For example, embodiments of the present invention provide laser systems useful for Laser Inertial Fusion Engine (LIFE) applications, including pure fusion LIFE engines, other users of pulsed average power lasers, and for pumping of various laser media in order to generate ultra-short laser pulses. Moreover, embodiments of the present invention provide architectures for laser systems operating in the stored energy, high average power mode of operation with performance characteristics not available using conventional designs. These and other embodiments of the invention along with many of its advantages and features are described in more detail in conjunction with the text below and attached figures.

BRIEF DESCRIPTION OF THE DRAWINGS

FIG. 1A is a simplified plan view of a transverse pumped amplifier system according to an embodiment of the present invention;

FIG. 1B is a simplified side view of the transverse pumped amplifier system illustrated in FIG. 1A;

FIG. 2A is a simplified plan view of a transverse pumped four-bean amplifier system according to an embodiment of the present invention;

FIG. 2B is a simplified side view of the transverse pumped four-beam amplifier system illustrated in FIG. 2A;

FIG. 5A is a simplified plan view of a pump delivery architecture according to an embodiment of the present invention;

FIG. 5B is a simplified side view of the pump delivery architecture illustrated in FIG. 5A;

DETAILED DESCRIPTION OF SPECIFIC EMBODIMENTS

Figure 1C:
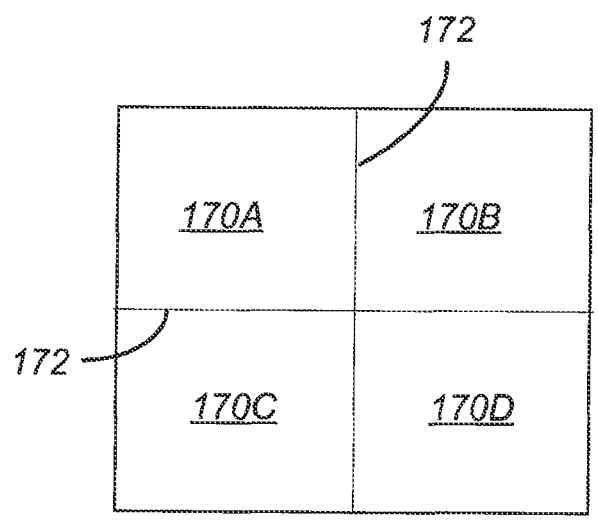
FIG. 1C is a simplified cross-section view of a subdivided amplifier aperture according to an embodiment of the present invention.

Embodiments of the present invention relate to laser systems. More specifically, the present invention relates to methods and systems for generating high power laser beams using a four-pass amplifier architecture. Merely by way of example, the invention has been applied to an amplifier assembly utilizing either transverse pumping or end pumping of amplifiers in a compact architecture. The methods and systems can be applied to a variety of other laser amplifier architectures and laser systems.

As described more fully below, embodiments of the present invention provide an amplifier module operable to amplify one, two, four, or more beams in a close coupling arrangement to form, in a four-beam arrangement, a "quad" amplifier utilizing either end or transverse pumping of the amplifier slabs. Accordingly, as shown in Table 1 below, embodiments of the present invention provide a single or quad amplifier module with reduced volume per beam aperture in comparison with conventional techniques. Embodiments of the present invention provide methods and systems to reduce asymmetries in the gain profiles, providing uniform gain as a function of transverse position.

TABLE 1

| Architecture | Single Beam Amplifier Module | | | | Quad Beam Amplifier Module | | | |
| --- | --- | --- | --- | --- | --- | --- | --- | --- |
| | Length (m) | Width (m) | Height (m) | Volume (m³) | Length (m) | Width (m) | Height (m) | Volume (m³) |
| End Pumped | 8.32 | 2.2 | 1.35 | 24.7 | 8.32 | 3.66 | 2.38 | 72.5 |
| Transverse Pumped | 9.5 | 1.3 | 1.28 | 15.8 | 9.5 | 2.2 | 2.38 | 49.7 |

Embodiments of the present invention provide a passive four pass architecture suitable for high average power operation. FIG. 1A is a simplified plan view of a transverse pumped amplifier module according to an embodiment of the present invention. Utilizing embodiments of the present invention, an amplifier module with dimensions of 9.5 m in length, 1.3 m in width, and 1.28 m in height is provided. Embodiments of the present invention are not limited to these particular dimensions, but these dimensions provide an indication of the compact size that the architectures discussed herein provide. Referring to FIG. 1A, a laser beam (for example, provided by a preamplifier module) is injected into the amplifier system using injection mirror 110. The laser beam may be multiplexed as suitable for high power operation. The injected beam reflects from mirror 112 down into the amplifier module and then reflects from polarizer 114 due to the polarization of the injected laser beam, which is aligned with respect to the transmission axis of polarizer 114. According to an embodiment of the present invention, the injected laser beam is characterized by an s-polarization and polarizer 114 is aligned to reflect the s-polarization and pass the p-polarization, although other embodiments can utilize a p-polarization state or other suitable polarization state. In some embodiments, the beam is injected utilizing angular multiplexing through a transport telescope.

The beam passes through the quarter waveplate 116. The quarter waveplate converts the s-polarized injected laser light to circular polarization (e.g., left-handed circular polarization) and lowers the B-integral. As described more fully below, the passive 4-pass architecture described herein utilizes the fact that right-handed polarization becomes left-handed upon normal incidence reflection from a mirror. The injected light then passes through two amplifier heads with image relaying used between amplifiers and end mirrors as described below. Referring to FIG. 1A, mirror 120 directs the light into amplifier 124, which is pumped along a transverse direction by diode arrays 126 and 128. In embodiments of the present invention, amplifier 124 can include multiple amplifier slabs, also referred to as slablets. Elements 120, 122, 124, 126, and 128 can be referred to as amplifier head 129. Additional description related to transverse pumping of laser amplifiers is provided in U.S. patent application Ser. No. 12/940,869, entitled "Transverse Pumped Laser Amplifier Architecture," filed on Nov. 5, 2010, the disclosure of which is hereby incorporated by reference in its entirety for all purposes.

As illustrated in FIG. 1, quarter waveplate 116 is positioned in a specific location in the architecture. In addition to this implementation, the quarter waveplate 116 could also be located in front of the back mirror 140 illustrated in FIG. 1A in order to allow injection of light with a linear polarization, (e.g., s-polarization in the example that follows), which would then pass through the quarter waveplate becoming circularly polarized (e.g., left hand circular polarization in this example), reflect off mirror 140, changing the handedness of the beam (e.g., becoming right circularly polarized) and exit the quarter waveplate in the p-polarization state as appropriate for the second and third amplification passes, then change to s-polarization for the fourth amplification pass. The quarter waveplate in front of cavity mirror 140 could also be replaced by a 45° Faraday rotator in order to obtain the same net effect on the polarization. One of ordinary skill in the art would recognize many variations, modifications, and alternatives.

After a first amplification pass through amplifier 124, light is reflected off of mirror 122 toward a relay telescope represented by lenses 130 and 132. In addition to image relaying, the relay telescope provides spatial filtering functionality. A 90° polarization rotator 134 is positioned between amplifier head 129 and amplifier head 136, which includes two turning mirrors and an amplifier transversely pumped by two diode arrays. The 90° polarization rotator 134 compensates for thermal birefringence in the amplifier slabs among other benefits. In embodiments in which the beam is in a circularly polarized state during amplification, thermal birefringence will tend to introduce ellipticity into the beam, which is removed by the multiple passes through polarization rotator 134. In the illustrated embodiment, image relaying is utilized between the amplifier heads 129 and 136.

Thermal birefringence is a potentially debilitating loss associated with isotropic gain media under thermal load. The adverse impacts of thermal birefringence has led some system designers to utilize Brewster's angle designs. After a first amplification pass through amplifier heads 129 and 136, the beam is image relayed to cavity mirror 140, where the circular polarization is modified from left-to-right (assuming the left handedness as discussed above). In some embodiments, mirror 140 is a deformable mirror operable to reduce or remove distortion from the amplified beam. As illustrated, a relay telescope is disposed along the optical path between the exit turning mirror of amplifier head 136 and the cavity mirror 140.

The beam, after the first pass through amplifier heads 129 and 136, reflects off mirror 140 and makes a second amplification pass through amplifier heads 136 and 129. On passing through quarter waveplate 116, the polarization is converted from right-handed circular polarization to p-polarization in this embodiment and, therefore, passes through polarizer 114. The beam is then image relayed using a relay telescope including lenses 142 and 144 to Pockels cell 146, through polarizer 148, which is crosses with respect to polarizer 116, to the second cavity mirror 150 then back through polarizer 148 and Pockels cell 146.

On the third pass through amplifier heads 129 and 136, the twice-amplified beam is in a left handed circular polarization state. After reflection off deformable mirror 140 and the fourth pass through heads 129 and 136, the quarter waveplate 116 converts the polarization to the s-polarization, which results in reflection off of polarizer 114 and mirror 112 into the upper level of the amplifier module. A transport telescope at the level of mirror 112 and discussed in relation to FIG. 1B transmits the light to output window 152.

Additional description related to Pockels cells suitable for use with embodiments of the present invention, particularly a Gap Coupled Electrode Pockels Cell, is provided in U.S. patent application Ser. No. 14/913,651, entitled "Electro-Optic Device with Gap-Coupled Electrode," filed on Oct. 27, 2010 and hereby incorporated by reference in its entirety for all purposes.

Referring to FIG. 1A, the amplifier heads 129 and 136 are excited using transverse pumping. As described in relation to FIGS. 3A-4B, the amplifiers can also be excited using end pumping. In these pumping designs, it is possible to utilize state-of-the-art high power diode bar technology combined with low diode pitch to create very high array intensities. In some embodiments, high pump intensities are provided through the use of polarization combining to double the effective array intensity. This pump source is then image relayed to the center of the amplifier. This architecture maintains the source intensity and divergence of the diode bars, which means the pump radiation has a relatively large Rayleigh range, providing efficient flat pump profile intensity to relatively thick amplifiers (for example, where the amplifier depth is close to the amplifier width and height). Additional description related to polarization combining techniques and transverse pumping of laser amplifiers is provided in U.S. patent application Ser. No. 12/940,869, entitled "Transverse Pumped Laser Amplifier Architecture," filed on Nov. 5, 2010, the disclosure of which is hereby incorporated by reference in its entirety for all purposes.

FIG. 1B is a simplified side view of the transverse pumped amplifier system illustrated in FIG. 1A. Referring to FIG. 1B, the relay telescope between the two amplifier heads 129 and 136 is illustrated by lenses 130 and 132 and the transport telescope used to direct the beam to the output window is illustrated by lenses 160 and 162. In some embodiments, longitudinal spatial filters (not shown) are utilized to improve the system performance. Additional description related to relay telescopes and spatial filters are provided in U.S. patent application Ser. No. 12/544,988, entitled "Spatial Filters for High Average Power Lasers," filed on Aug. 20, 2009, the disclosure of which is hereby incorporated by reference in its entirety for all purposes.

Spatial filtering serves as one form of gain isolation, limiting parasitic light between the two high gain amplifiers. Additionally, spatial filtering resets the B-integral, enabling higher extraction efficiency while maintaining beam quality on the last pass through the amplifiers. Relay imaging improves extraction efficiency by reducing vignetting associated with the multiplexing angle and by enabling higher contrast beams with larger mode fill to extract the power from the amplifier. Additionally, relay imaging enables lower quality optics to be used while maintaining a high contrast beam. Although relay telescopes are illustrated in some embodiments of the present invention in order to improve the beam quality, they are not required by the present invention and are optional in some designs. Additionally, the use of spatial filters between the amplifier heads are also optional for designs less constrained by parasitic issues. Therefore, relay telescopes, spatial filters, and the like are not required by the present invention and may be optional in some implementations. One of ordinary skill in the art would recognize many variations, modifications, and alternatives.

As illustrated in FIG. 1B, polarization combining is used in the diode array pumps 126 and 128 to increase the pump intensity coupled to the amplifier 124. As described more fully throughout the present specification, a variety of polarization combination techniques can be implemented in conjunction with embodiments of the present invention. Light is reflected by mirror 112 and the polarizer 114 into the lower plane including the amplifier heads and the relay telescope 130 and 132. In the side view illustrated in FIG. 1B, the gas cooling system is illustrated as providing helium gas cooling to the amplifier slabs in each of the amplifiers. Embodiments of the present invention provide line replaceable units (LRUs) with gas cooling and electrical and other connections that are removable for LRU replacement. One of ordinary skill in the art would recognize many variations, modifications, and alternatives.

The folding of the beam line between the amplifier heads to the first cavity mirror and the second cavity mirror after the first two amplification passes enables a compact design not available using conventional designs. The compact design discussed herein enables high power operation that makes these designs suitable for a wide variety of applications, particularly applications in which the laser amplifier module is transportable.

Although FIGS. 1A and 1B illustrate a single aperture for each of the amplifiers in the amplifier heads, this is not required by embodiments of the present invention. In alternative embodiments, the aperture is subdivided into smaller contiguous apertures to decrease the beam aperture dimension. FIG. 1C is a simplified cross-section view of a subdivided amplifier aperture according to an embodiment of the present invention. In the amplifier illustrated in FIG. 1C, the aperture is subdivided into four subapertures 170A, 170B, 170C, and 170D across the transverse direction. Accordingly, during amplification, light passes through the amplifier into the plane of the image. In these embodiments, the input beam, rather than being a single beam, can be provided as a set of generally parallel and coherent input beams. The subdivision of the aperture facilitates the manufacturing process since optical elements with smaller transverse dimensions can be utilized. Additionally, regions 172 between the optical elements have increased propagation losses, reducing the impact of transverse amplified spontaneous emission. Although four subapertures 170A, 170B, 170C, and 170D are illustrated in FIG. 1C, the present invention is not limited to this particular configuration and other subaperture configurations can be utilized according to embodiments of the present invention.

In addition to or rather than the amplifiers, other system components can be formed using subaperture techniques, including the polarization rotators, the frequency converters, the Pockels cell, and the like. In embodiments in which the amplifier is provided as a subaperture system, the diode array pumps can be divided as well, providing for gaps that can include cooling elements or other suitable elements. One of ordinary skill in the art would recognize many variations, modifications, and alternatives. In some embodiments, the preamplifier module (e.g., a fiber oscillator) can be integrated into the amplifier module rather than being provided from an external source. In embodiments in which spatial filter/relay imaging is included in the amplifier module, there is associated space that can be used for the preamplifier module location (i.e., resulting from the amplifier column height relative to the beam height). Locating the preamplifier module in the amplifier module will reduce the impact of issues related to an external location of the preamplifier module, which may require a rigid connection via image relay telescope to the amplifier module. Additionally, vibrations or displacements of the preamplifier module relative to the amplifier module can result in pointing errors, improper injection, and/or efficiency loss, issues which are ameliorated by the integration of the preamplifier module in the amplifier module.

FIG. 2A is a simplified plan view of a transverse pumped four-bean amplifier system according to an embodiment of the present invention. In the embodiment illustrated in FIGS. 2A and 2B, an amplifier module with dimensions of 9.5 m in length, 2.2 m in width, and 2.38 m in height is provided, although embodiments of the present invention are not required to have these exact dimensions. The architecture illustrated in FIGS. 2A and 2B shares some similarities with the architecture illustrated in FIGS. 1A and 1B, but utilizes four amplifiers per amplifier head in a two-by-two configuration as illustrated in FIG. 2B. Thus, these embodiments can be referred to as a "quad" configuration.

Referring to FIG. 2A, light is injected as illustrated by arrows 210 toward mirrors 212 and 214 and polarizers 216 and 218. Thus, two beam paths are provided in comparison with the single beam path illustrated in FIGS. 1A and 1B. Light in each of the beam paths then propagates toward a first quad amplifier head 220. Amplifier head 220 includes four amplifiers, each of which can include a set of amplifier slabs. The amplifiers are pumped by four diode arrays in a transverse pumping arrangement, with one diode array pumping each of the amplifiers. Although a two-by-two configuration is illustrated in FIG. 2B, this particular configuration is not required and a one-by-two configuration or other suitable configurations can be utilized within the scope of the invention. Because the amplifiers are only pumped from one side, an asymmetry in the transverse gain profile may result. As illustrated in FIG. 2A, light amplified by the inner amplifiers of amplifier head 220 are amplified by the outer amplifiers of amplifier head 230, reducing the gain asymmetry.

FIG. 2B is a simplified side view of the transverse pumped four-beam amplifier system illustrated in FIG. 2A.

In this side view, the two-by-two configuration of the amplifiers in the amplifier heads is clearly illustrated as well as the amplifier slab cooling system. In this configuration, light is injected into the amplifier module at top and bottom levels and then amplified in the plane of the two sets of amplifiers disposed between the top and bottom levels. Thus, the quad configuration provides a variation on the configuration illustrated in FIGS. 1A and 1B in a mirrored orientation. One of ordinary skill in the art would recognize many variations, modifications, and alternatives.

Although some elements are omitted for the purposes of clarity, the relay telescopes between the two amplifier heads are illustrated in the lower portion of FIG. 2A and the transport telescopes are illustrated at the top and bottom portions of FIG. 2B.

Figure 3A:
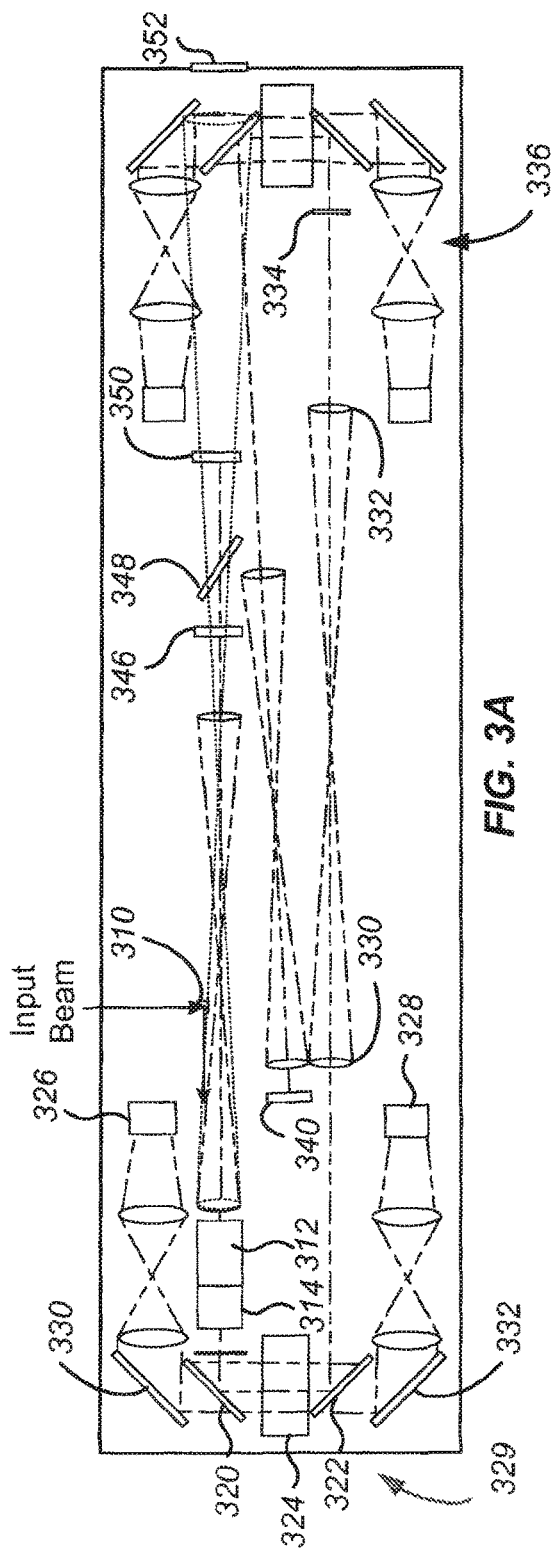
FIG. 3A is a simplified plan view of an end pumped amplifier system according to an embodiment of the present invention.

FIG. 3A is a simplified plan view of an end pumped amplifier system according to an embodiment of the present invention. In the embodiment illustrated in FIGS. 3A and 3B, an amplifier module with dimensions of 8.32 m in length, 2.2 m in width, and 1.35 m in height is provided, although embodiments of the present invention are not required to have these exact dimensions. As described more fully below, the end pumping of the amplifiers results in a shorter amplifier module than in other designs utilizing transverse pumping.

Light is injected into the amplifier module through mirror 310 and reflected off of mirror 312 into the lower portion of the amplifier module where it is reflected off of polarizer 314 toward amplifier head 329. In the embodiment illustrated in FIGS. 3A and 3B, the amplifier head 329 includes diode pump arrays 326 and 328, which are optically coupled to the amplifier 324 using mirrors 330 and 332 as well as other suitable optics. Mirrors 320 and 322 are dichroic, passing light at the pump wavelength and reflecting light at the laser wavelength. Thus, the pump light passes through mirrors 320 and 322 to pump amplifier 324 using a face pumping configuration, which can include a number of amplifier slabs.

Because of the folded configuration for the diode array pumps with respect to the amplifier utilizing mirrors 330 and 332, the length of the amplifier module can be decreased in comparison with other configurations. Other components in common with FIGS. 1A and 1B are illustrated as will be evident to one of ordinary skill in the art. As examples, a relay telescope including lenses 330 and 332, 90° polarization rotator 334 and cavity mirror 340 are illustrated. Optics along the optical path after the first two amplification passes include Pockels cell 346, polarizer 348 and cavity mirror 350.

Figure 3B:
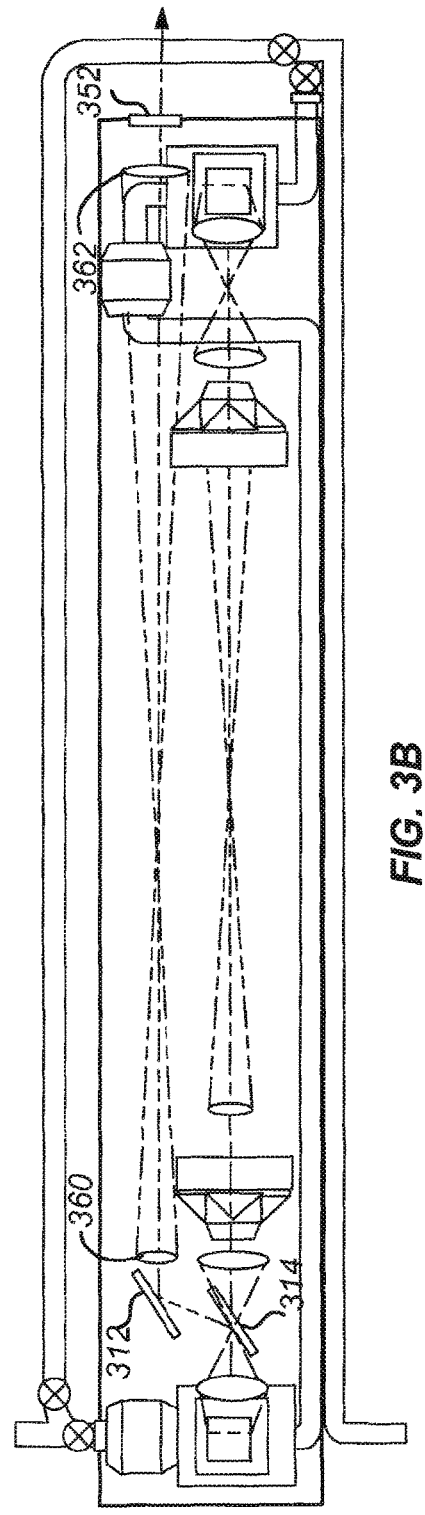
FIG. 3B is a simplified side view of the end pumped amplifier system illustrated in FIG. 3A.

FIG. 3B is a simplified side view of the end pumped amplifier system illustrated in FIG. 3A. As illustrated in FIG. 3B, polarization combining of the diode arrays is used to increase the pump intensity. In this embodiment, light from two arrays at the top and bottom of the set of arrays and with a first polarization is reflected twice to propagate collinearly with light from two arrays in the middle of the set of arrays. Other configurations are possible, including two arrays oriented at right angles to each other with a polarization sensitive reflector disposed between the arrays at an angle of 45° to each array. Light from a first array passes through the polarization sensitive reflector while the light from the second array is reflected to become collinear with the light from the first array. Thus, embodiments of the present invention can utilize various polarization combination designs for the diode pumps. One of ordinary skill in the art would recognize many variations, modifications, and alternatives. Transport telescope including lenses 360 and 362 used to transport light out of the cavity through output window 352 is illustrated. Utilizing the embodiment illustrated in FIGS. 3A and 3B, a fusion class laser system is provided that produces a 6.3 kJ beam at 15 Hz in an amplifier module with dimensions of 1.3 m×2.2 m×8.3 in.

Figure 4A:
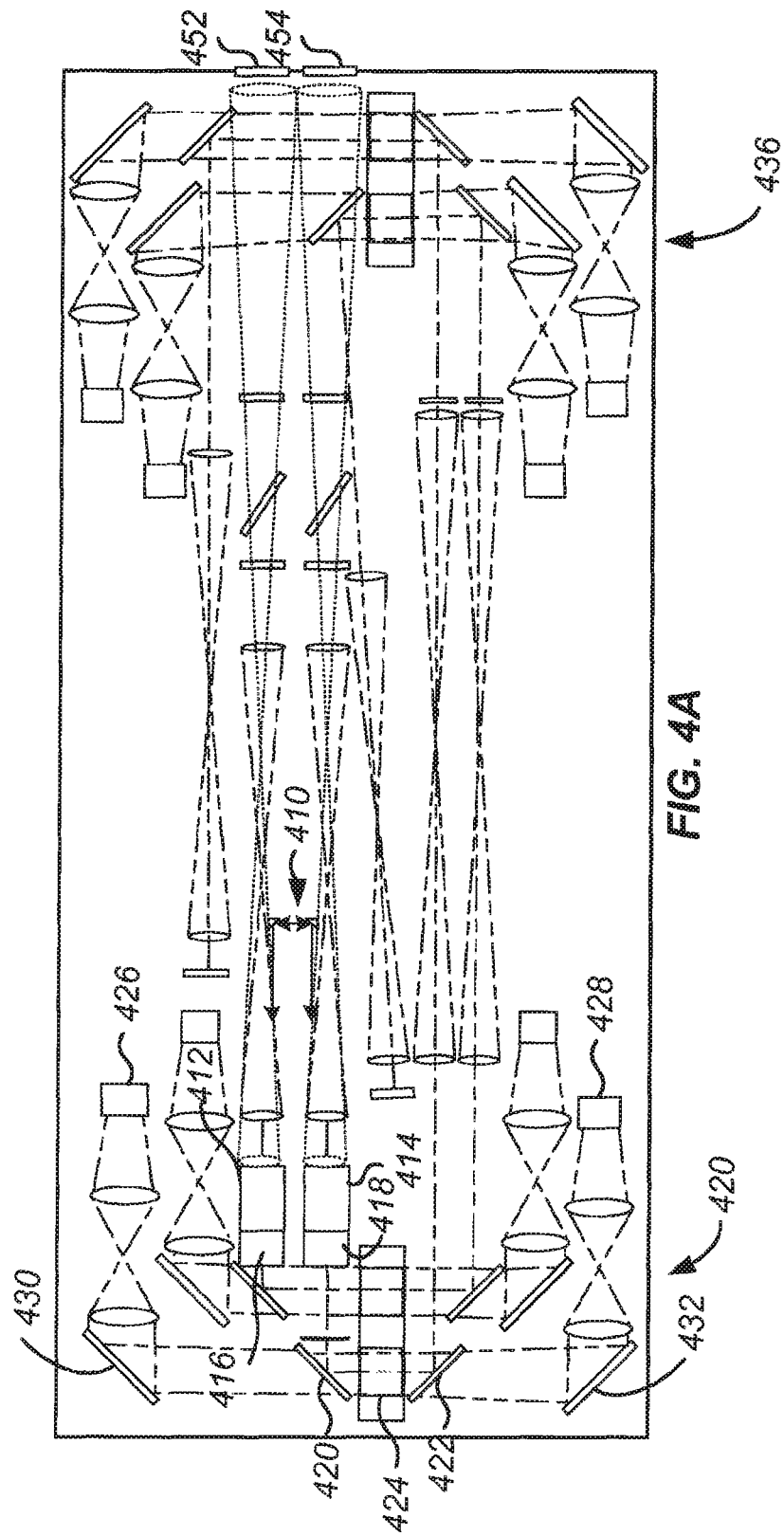
FIG. 4A is a simplified plan view of an end pumped four-beam amplifier system according to an embodiment of the present invention.
Figure 4B:
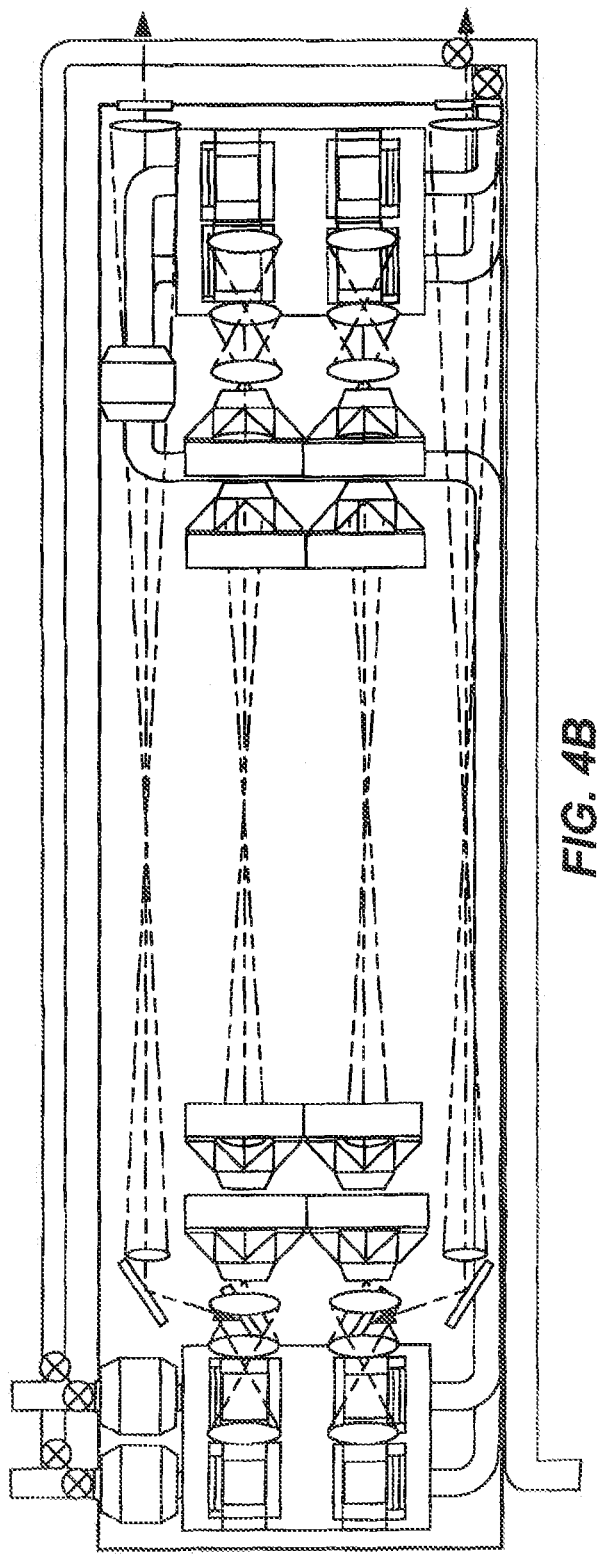
FIG. 4B is a simplified side view of the end pumped four-beam amplifier system illustrated in FIG. 4A.

FIG. 4A is a simplified plan view of an end pumped four-beam amplifier system according to an embodiment of the present invention. In the embodiment illustrated in FIGS. 4A and 4B, an amplifier module with dimensions of 8.32 m in length, 3.66 m in width, and 2.3.8 m in height is provided, although embodiments of the present invention are not required to have these exact dimensions. The architecture illustrated in FIGS. 4A and 4B shares some similarities with the architecture illustrated in FIGS. 3A and 3B, but utilizes four amplifiers per amplifier head in a two-by-two configuration as illustrated in FIG. 4B. Thus, these embodiments can be referred to as a "quad" configuration. For purposes of clarity, some of the optical elements that are common between the single amplifier and quad amplifier configurations are omitted. One of ordinary skill in the art would recognize many variations, modifications, and alternatives.

Referring to FIG. 4A, light is injected as illustrated by arrows 410 toward mirrors 412 and 414 and polarizers 416 and 418. Thus, two beam paths are provided in comparison with the single beam path illustrated in FIGS. 3A and 3B. Light in each of the beam paths then propagates toward a first quad amplifier head 420. Amplifier head 420 includes four amplifiers, each of which can include a set of amplifier slabs. The amplifiers are pumped by four diode arrays in an end pumping arrangement, with one diode array pumping each of the amplifiers. Although a two-by-two configuration is illustrated in FIG. 4B, this particular configuration is not required and a one-by-two configuration or other suitable configurations can be utilized within the scope of the invention.

FIG. 4B is a simplified side view of the end pumped four-beam amplifier system illustrated in FIG. 4A. In this side view, the two-by-two configuration of the amplifiers in the amplifier heads is clearly illustrated as well as the amplifier slab cooling system. In this configuration, light is injected into the amplifier module at top and bottom levels and then amplified in the plane of the two sets of amplifiers disposed between the top and bottom levels. Thus, the quad configuration provides a variation on the configuration illustrated in FIGS. 3A and 3B in a mirrored orientation. One of ordinary skill in the art would recognize many variations, modifications, and alternatives.

As discussed in relation to FIG. 3A, mirrors 430 and 432 reflect pump light from diode pump arrays 426 and 428, respectively, toward amplifier 424. Mirrors 420 and 422 are dichroic, passing light at the pump wavelength and reflecting light at the laser wavelength. Thus, the pump light passes through mirrors 420 and 422 to pump amplifier 424, which can include a number of amplifier slabs. Pumping of the other amplifiers is accomplished using similar arrangements of diode pump arrays, optics, and the like. A second amplifier head 436 includes another quad of end pumped amplifiers. Light exits the amplifier module through output windows 452 and 454.

FIG. 5A is a simplified plan view of a pump delivery architecture according to an embodiment of the present invention. As illustrated in FIG. 5A, a diode pump array 510 is coupled through a homogenizer 512 and duct 514 to pump amplifier 520. The optical elements illustrated in FIG. 5A can be utilized in conjunction with the architectures illustrated in FIGS. 1A-4B as elements of the diode pumping systems. FIG. 5B is a simplified side view of the pump delivery architecture illustrated in FIG. 5A. In this embodiment, a Fresnel prism 530 is utilized to collect and focus light from the diode pump array 510. In an embodiment, the distance between the diode pump array 510 and the amplifier 520 is 5 m, although other distances can be utilized. One of ordinary skill in the art would recognize many variations, modifications, and alternatives.

Figure 6:
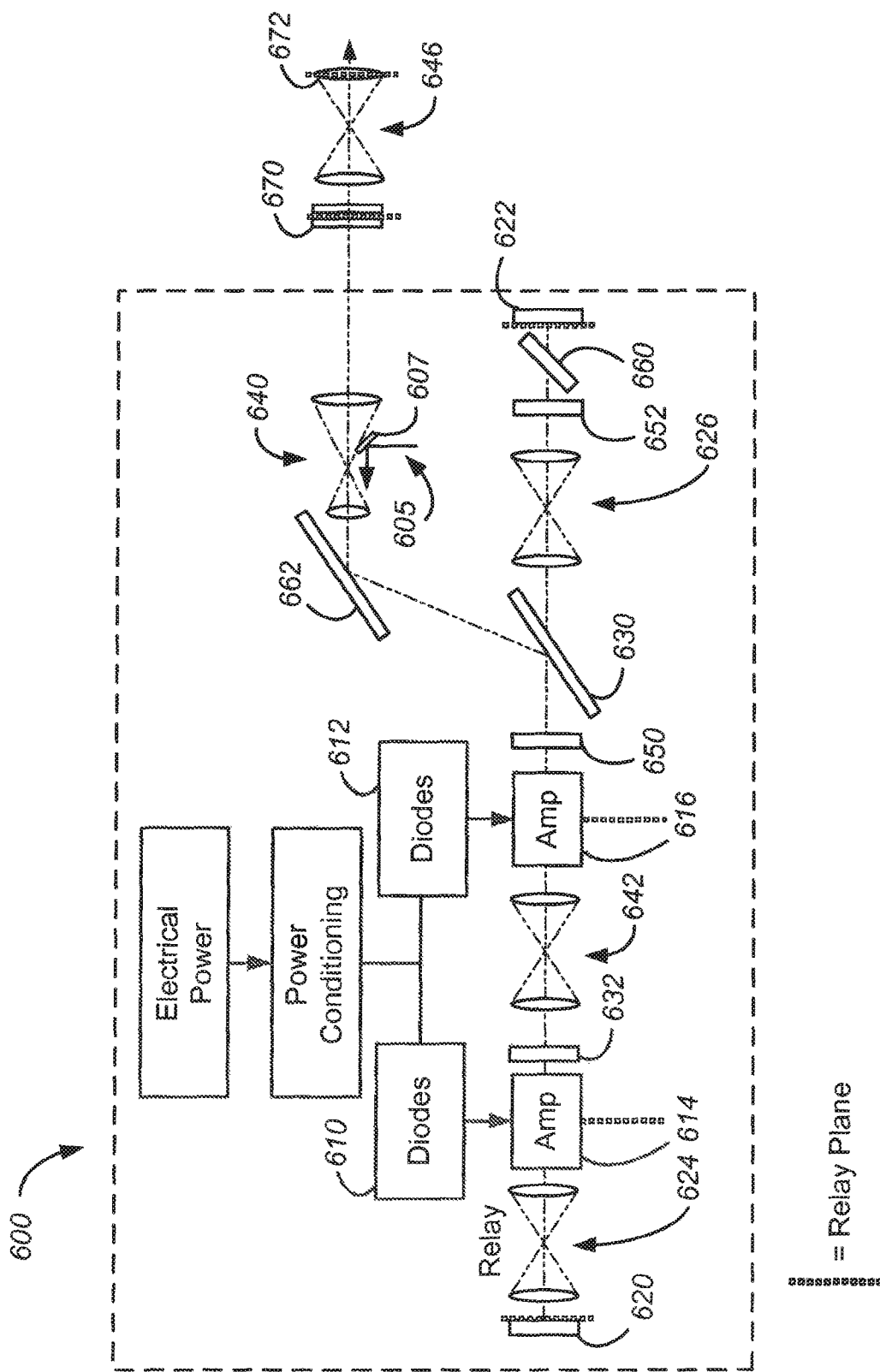
FIG. 6 is a laser amplifier system according to an embodiment of the present invention.

FIG. 6 is a laser amplifier system according to an embodiment of the present invention. The laser amplifier system 600 illustrated in FIG. 6 utilizes a dual amplifier architecture in a cavity utilizing image relaying to improve system efficiency. An input beam 605 is injected into the cavity using injection mirror 607. In an embodiment, the input beam is a laser pulse having an energy of 0.9 J. The input beam reflects off mirror 662. The polarization of the input beam is a predetermined polarization (e.g., s-polarization) so that the input beam reflects off of polarizer 630, which is aligned to reflect the polarization state of the input beam 605. The input beam passes through quarter-waveplate 650 and makes a first pass through amplifier 616 and amplifier 614.

Disposed between amplifier 616 and amplifier 614 is a spatial filter 642 in the form of a telescope and a pinhole (not shown). Other spatial filters can be utilized according to embodiments of the present invention and the pinhole filter illustrated is merely provided by way of example. After the first amplification pass through amplifier 616, the beam passes through a polarization rotator 630 (e.g., a quartz rotator) before the first amplification pass through amplifier 614. A relay telescope 624 is provided to relay the image formed at the center of amplifier 614 to a reflective surface of mirror 620. Image relaying is illustrated by the group of aligned squares illustrated at the center of amplifier 614 and the surface of mirror 620 as well as other locations in the system.

The amplified light is reflected from mirror 620, passes back through relay telescope 624, and makes a second pass through the set of amplifiers 614 and 616. After passing through the quartz rotator 632 and the quarter-waveplate 650 two times, the polarization of the amplified beam is rotated to enable the beam to pass through polarizer 630. The beam passes through relay telescope 626, Pockels cell 652 and polarizer 660, which is crossed with respect to polarizer 630. Relay telescope 626 relays an image at the center of amplifier 616 to the reflective surface of mirror 622. The intensity of the amplified beam at Pockels cell 652 is produced by two amplification passes through the set of amplifiers. Although the input beam may have passed through multiple amplifier slabs in each amplifier 614 and 616, the beam at Pockels cell 652 is referred to as a twice amplified beam. The Pockels cell is activated to rotate the polarization of the twice amplified beam by half a wave so that it passes through polarizer 630 as the beam propagates toward the amplifiers. In an alternative embodiment, the Pockels cell could be a quarter-wave Pockels cell and polarizer 660 would be replaced with a quarter waveplate, for example, positioned adjacent relay telescope 626 to provide for polarization rotation.

After two more passes through the amplifiers, the beam is reflected from polarizer 630 and mirror 662 towards the final optic 672. The beam, after four amplification passes, is transmitted through spatial filter 640 and frequency converter 670. Relay telescope 646 relays an image of the beam at the frequency converter 670 to the final optic 672. In some embodiments, a neutron pinhole is utilized to protect the amplifier system from neutrons emitted by fusion events.

Figure 7:
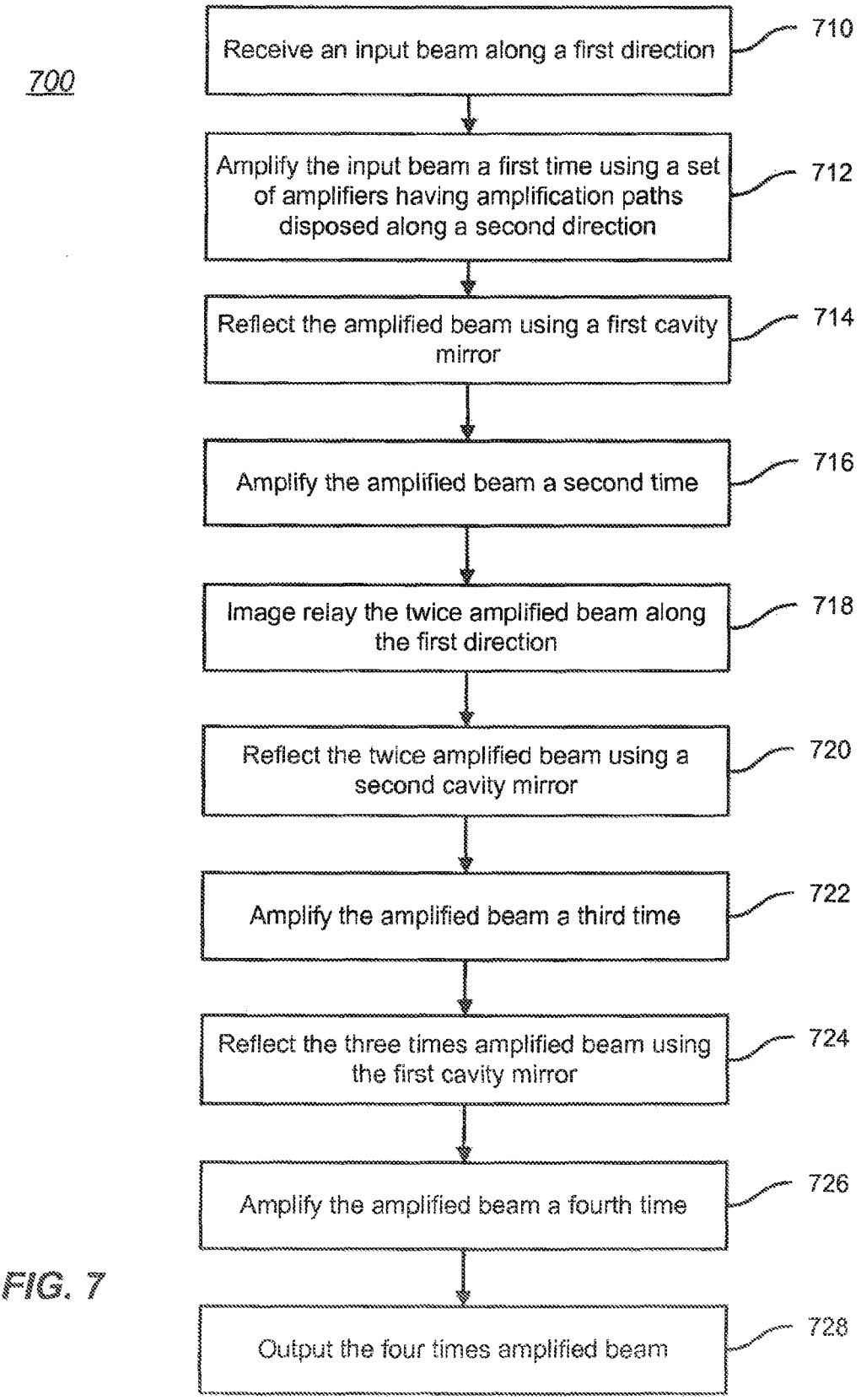
FIG. 7 is a simplified flowchart illustrating a method of providing an amplified laser beam according to an embodiment of the present invention.

FIG. 7 is a simplified flowchart illustrating a method of providing an amplified laser beam according to an embodiment of the present invention. The method 700 includes receiving an input beam and directing the input beam along a first direction (710) and amplifying the input beam a first time using a set of amplifiers (712), also referred to as amplifier heads. The amplification paths through the set of amplifiers are disposed along a second direction substantially orthogonal to the first direction. As illustrated in FIG. 1A, the amplification path through the amplifier heads is generally aligned with the width of the amplifier module, which is orthogonal to the length of the amplifier module. Thus, in the illustrated embodiment, the first direction is along a longitudinal direction of the amplifier module, which directs the beam from a central portion of the amplifier module toward a first end of the amplifier module at which a first amplifier head is positioned.

The method also includes reflecting the amplified beam using a first cavity mirror (714) and amplifying the amplified beam a second time using the set of amplifiers (716). In some embodiments, the first cavity mirror is a deformable mirror that can be used to compensate for distortions in the beam. The method further includes image relaying the twice amplified beam along the first direction (718) and reflecting the amplified beam using a second cavity mirror (720). After the first two amplification passes, the method can include rotating a polarization state of the twice amplified beam using a Pockels cell in order to enable the twice amplified beam to be amplified two additional times before being coupled out of the amplifier module.

Additionally, the method includes amplifying the twice amplified beam a third time using the set of amplifiers (722), reflecting the three times amplified beam using the first cavity mirror (724), amplifying the three times amplified beam using the set of amplifiers (726), and outputting the four times amplified beam. In some embodiments, the input beam and the four times amplified beam are characterized by a linear polarization, for example, an s-polarization or a p-polarization. Moreover, as discussed in relations to FIGS. 1A and 1B, the amplified beam, the twice amplified beam, and the three times amplified beam can be characterized by a circular polarization during the amplification passes through the amplifier heads.

According to embodiments of the present invention, image relaying is performed relay imaging between the set of amplifiers, for example, performing image relaying between amplifying the three times amplified beam using the set of amplifiers and outputting the four times amplified beam.

It should be appreciated that the specific steps illustrated in FIG. 7 provide a particular method of providing an amplified laser beam according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A quad-beam laser amplifier module including an enclosure, the quad-beam laser amplifier module comprising:
   a set of four input ports disposed on a top surface of the enclosure;
   a set of four output ports disposed on the second end of the enclosure;
   a first amplifier head disposed at a first end of the enclosure, wherein the first amplifier head includes four amplifiers;
   a second amplifier head disposed at a second end of the enclosure, wherein the second amplifier head includes four amplifiers; and
   a cavity mirror operable to reflect light into the second amplifier head.

2. The quad-beam laser amplifier module of claim 1 further comprising a set of four relay telescopes disposed between the first amplifier head and the second amplifier head.

3. The quad-beam laser amplifier module of claim 1 wherein beams passing through a set of outside amplifiers of the four amplifiers of the first amplifier head pass through a set of inside amplifiers of the four amplifiers of the second amplifier head.

4. The quad-beam laser amplifier module of claim 1 further comprising a plurality of Pockels cells operable to receive amplified beams after two amplification passes through the first amplifier head and the second amplifier head.

5. The quad-beam laser amplifier module of claim 1 further comprising a second set of four relay telescopes disposed the second amplifier head and the cavity mirror.

6. The quad-beam laser amplifier module of claim 1 further comprising a set of four transport telescopes optically coupled to the set of four output ports.

7. The quad-beam laser amplifier module of claim 1 wherein the cavity mirror comprises a deformable mirror.

8. The quad-beam laser amplifier module of claim 1 further comprising a Pockels cell and a second cavity mirror operable to reflect amplified beams into the first amplifier head.

9. The quad-beam laser amplifier module of claim 8 wherein the first amplifier head and the second amplifier head are transverse pumped by diode arrays.

10. The quad-beam laser amplifier module of claim 8 wherein the first amplifier head and the second amplifier head are end pumped by diode arrays.

11. The quad-beam laser amplifier module of claim 10 wherein the diode arrays are optically coupled to the amplifier heads through dichroic mirrors.

* * * * *